US012722592B2

(12) United States Patent
Tomita et al.

(10) Patent No.: US 12,722,592 B2
(45) Date of Patent: Sep. 1, 2026

(54) GAS GENERATOR

(71) Applicant: NIPPON KAYAKU KABUSHIKI KAISHA, Tokyo (JP)

(72) Inventors: Ozora Tomita, Himeji (JP); Takahiro To, Himeji (JP); Tomoya Kawashima, Himeji (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/994,331

(22) PCT Filed: Aug. 28, 2023

(86) PCT No.: PCT/JP2023/030905
§ 371 (c)(1),
(2) Date: Jan. 14, 2025

(87) PCT Pub. No.: WO2024/048501
PCT Pub. Date: Mar. 7, 2024

(65) Prior Publication Data

US 2026/0014958 A1 Jan. 15, 2026

(30) Foreign Application Priority Data

Aug. 29, 2022 (JP) ................................ 2022-136013

(51) Int. Cl.
*B60R 21/264* (2006.01)
*B60R 21/26* (2011.01)

(52) U.S. Cl.
CPC . *B60R 21/2644* (2013.01); *B60R 2021/26011* (2013.01); *B60R 2021/26029* (2013.01); *B60R 2021/26076* (2013.01)

(58) Field of Classification Search
CPC .............. B60R 21/264; B60R 21/2642; B60R 21/2644; B60R 21/2648

(Continued)

(56) References Cited

U.S. PATENT DOCUMENTS

2020/0198571 A1 6/2020 Knollhuber et al.
2021/0129788 A1* 5/2021 Hagihara ................ B21J 5/025
(Continued)

FOREIGN PATENT DOCUMENTS

JP 2007-314102 A 12/2007
JP 2020-517522 A 6/2020
(Continued)

OTHER PUBLICATIONS

International Search Report issued Oct. 31, 2023 in PCT/JP2023/030905, filed on Aug. 28, 2023, 2 pages.

*Primary Examiner* — Bret Hayes
(74) *Attorney, Agent, or Firm* — Oblon, McClelland, Maier & Neustadt, L.L.P.

(57) ABSTRACT

A gas generator includes a housing main body, a holder assembly, and an igniter. The holder assembly includes a metallic holder portion and a connector portion made of resin. The holder portion includes a first barrel portion in a cylindrical shape provided with a first end surface provided with a recess, and the connector portion includes a second barrel portion in a cylindrical shape provided with a second end surface provided with a projection and a locking portion that projects toward an inner circumferential surface of the housing main body provided with a step portion. In an axial direction, the projection and the recess abut on each other and the locking portion and the step portion abut on each other, and in a circumferential direction, the projection and the recess abut on each other, so that the connector portion is immovably fixed in the axial direction and the circumferential direction.

10 Claims, 14 Drawing Sheets

(58) Field of Classification Search
USPC .................................................. 102/530, 531
See application file for complete search history.

(56) References Cited

U.S. PATENT DOCUMENTS

| | | | | |
|---|---|---|---|---|
| 2022/0205765 | A1 | 6/2022 | Yonezawa | |
| 2024/0149824 | A1* | 5/2024 | Shimizu .................. | C06D 5/00 |
| 2024/0318943 | A1 | 9/2024 | Fukushima et al. | |

FOREIGN PATENT DOCUMENTS

| | | | | | |
|---|---|---|---|---|---|
| JP | 2021-138190 | A | | 9/2021 | |
| JP | 2024178725 | A | * | 12/2024 | ................ B01J 7/00 |
| WO | WO 2021/054117 | A1 | | 3/2021 | |
| WO | WO 2023/100407 | A1 | | 6/2023 | |
| WO | WO 2023/149167 | A1 | | 8/2023 | |

* cited by examiner 1
20
20B
20A
43
92
27
41
40
42
60
S1
10
70
IV
91
50
80
S2
11
81
82
90
30

GAS GENERATOR

CROSS-REFERENCE TO RELATED APPLICATIONS

The present application is a 35 U.S.C. § 371 National Stage Application of International Patent Application PCT/JP2023/030905, filed Aug. 28, 2023, which is based on and claims the benefit of priority to Japanese Application No. 2022-136013, filed Aug. 29, 2022. The entire contents of these applications are incorporated herein by reference.

TECHNICAL FIELD

The present invention relates to a gas generator incorporated in an air bag apparatus as a passenger protection apparatus equipped in a car and the like, and particularly to what is called a cylinder type gas generator having an elongated columnar outer geometry that is suitably incorporated into a side air bag apparatus and the like.

BACKGROUND ART

From a point of view of protection of a driver and/or a passenger in a car, an air bag apparatus which is a passenger protection apparatus has conventionally widely been used. The air bag apparatus is equipped for the purpose of protecting a driver and/or a passenger against shock caused at the time of collision of a vehicle, and it receives a body of a driver or a passenger with the air bag serving as a cushion by instantaneously expanding and developing the air bag at the time of collision of a vehicle.

A gas generator is equipment which is incorporated in this air bag apparatus, an igniter therein being ignited in response to power feed caused by a control unit at the time of collision of a vehicle to thereby burn a gas generating agent with flame caused by the igniter and instantaneously generate a large amount of gas, and thus expands and develops an air bag.

Depending on a position of installation in a vehicle and the like or on specifications such as output, gas generators of various constructions are available. A gas generator called a cylinder type gas generator represents one example. The cylinder type gas generator has an outer geometry in an elongated columnar shape and it is suitably incorporated in a side air bag apparatus, a curtain air bag apparatus, a knee air bag apparatus, or a seat cushion air bag apparatus.

Normally, in a cylinder type gas generator, an igniter is assembled at one end in an axial direction of a housing, a gas generating agent accommodation chamber accommodating a gas generating agent is provided on a side of the one end, a filter chamber accommodating a filter is provided on a side of the other end in the axial direction of the housing, and a gas discharge opening is provided in a circumferential wall portion of the housing in a portion defining the filter chamber.

In the cylinder type gas generator thus constructed, the gas generating agent burns as the igniter is activated. Gas is thus generated in the inside of the housing. After generated gas passes through the filter, gas is discharged to the outside through the gas discharge opening.

For example, Japanese Patent Laying-Open No. 2007-314102 (PTL 1) discloses a cylinder type gas generator of this type. In PTL 1, the housing includes a housing main body substantially in a shape of a circular cylinder and a holder inserted in an opening end of the housing main body.

The holder described above is required to achieve such functions and characteristics thereof as holding of the igniter, reception of a connector connected to the igniter, secure connection thereof to the housing main body, and strength enough to withstand increase in internal pressure in the combustion chamber at the time of activation of the gas generator. Therefore, the holder is inevitably complicated in shape, which requires higher accuracy in working. Consequently, component cost of the holder becomes disadvantageously high. In recent years, reduction in weight of the gas generator has strongly been demanded. The holder, however, is a relatively large component made of metal, and the cylinder type gas generator also disadvantageously increases in weight.

In this connection, for example, Japanese National Patent Publication No. 2020-517522 discloses a cylinder type gas generator that achieves reduction in manufacturing cost and weight of a holder by forming a connector portion of the holder that can receive a connector, from another member made of resin.

CITATION LIST

Patent Literature

PTL 1: Japanese Patent Laying-Open No. 2007-314102
PTL 2: Japanese National Patent Publication No. 2020-517522

SUMMARY OF INVENTION

Technical Problem

In general, in a cylinder type gas generator, as necessary, a shorting clip is inserted in and attached to a connector portion made of resin where a connector can be received. The shorting clip serves to intentionally short-circuit a terminal pin of an igniter to thereby prevent erroneous operation of the cylinder type gas generator by electrostatic discharge or the like during transport or the like of the cylinder type gas generator.

In the cylinder type gas generator disclosed in PTL 2, an assembly structure has been adopted, in which the connector portion is fixed to the housing main body by what is called snap fitting achieved by a locking portion and a step portion where the locking portion can be locked.

In the case of the above assembly structure, however, wobbling in the connector portion in an axial direction and a circumferential direction thereof often occurs. This wobbling may induce erroneous operation of the cylinder type gas generator due to unintended cancellation of short-circuiting of the terminal pin of the igniter by the shorting clip. Wobbling may also induce defective power feed due to unintended cancellation of electrical conduction between a core of a harness and the terminal pin of the igniter in power feed to the igniter by insertion of the harness in the connector portion in a stage of assembly of the cylinder type gas generator to an air bag apparatus.

Therefore, the present invention was made in view of such problems, and an object thereof is to provide a gas generator capable of achieving stable operations while achieving reduction in manufacturing cost and weight.

Solution to Problem

A gas generator based on a first aspect of the present invention includes a housing main body, a holder assembly, and an igniter. The housing main body is made of a cylindrical member made of metal, the member containing a combustion chamber where a gas generating agent is accommodated. The holder assembly is inserted in an opening end in an axial direction of the housing main body, and includes a hollow opening like a through hole, the hollow opening extending along a direction in parallel to the axial direction. The igniter includes an ignition portion where an ignition agent is accommodated and a terminal pin connected to the ignition portion, and at least a part of the igniter is arranged in the inside of the hollow opening while the ignition portion is located on a side of the combustion chamber and the terminal pin is located opposite to the side of the combustion chamber. The holder assembly includes a holder portion made of metal, the holder portion being located on the side of the combustion chamber, the holder portion receiving and holding the igniter, and a connector portion made of resin, the connector portion being located opposite to the side of the combustion chamber, the connector portion receiving a connector connected to the terminal pin. The holder portion includes a first barrel portion in a cylindrical shape that defines the hollow opening. The connector portion includes a second barrel portion in a cylindrical shape that defines the hollow opening and a locking portion that projects from the second barrel portion toward an inner circumferential surface of the housing main body. The first barrel portion is provided with a first end surface that faces the second barrel portion, at an end of the first barrel portion opposite to the combustion chamber. The first end surface is provided with a recess. The second barrel portion is provided with a second end surface that faces the first barrel portion, at an end of the second barrel portion on the side of the combustion chamber. The second end surface is provided with a projection. The inner circumferential surface of the housing main body is provided with a step portion where the locking portion can be locked. In the gas generator based on the first aspect of the present invention, the projection and the recess abut on each other in the axial direction and the locking portion and the step portion abut on each other in the axial direction so that the connector portion is immovably fixed in the axial direction. In the gas generator based on the first aspect of the present invention, the projection and the recess abut on each other in a circumferential direction of the housing main body so that the connector portion is immovably fixed in the circumferential direction.

A gas generator based on a second aspect of the present invention includes a housing main body, a holder assembly, and an igniter. The housing main body is made of a cylindrical member made of metal, the member containing a combustion chamber where a gas generating agent is accommodated. The holder assembly is inserted in an opening end in an axial direction of the housing main body, and includes a hollow opening like a through hole, the hollow opening extending along a direction in parallel to the axial direction. The igniter includes an ignition portion where an ignition agent is accommodated and a terminal pin connected to the ignition portion, and at least a part of the igniter is arranged in the inside of the hollow opening while the ignition portion is located on a side of the combustion chamber and the terminal pin is located opposite to the side of the combustion chamber. The holder assembly includes a holder portion made of metal, the holder portion being located on the side of the combustion chamber, the holder portion receiving and holding the igniter, and a connector portion made of resin, the connector portion being located opposite to the side of the combustion chamber, the connector portion receiving a connector connected to the terminal pin. The holder portion includes a first barrel portion in a cylindrical shape that defines the hollow opening. The connector portion includes a second barrel portion in a cylindrical shape that defines the hollow opening and a locking portion that projects from the second barrel portion toward an inner circumferential surface of the housing main body. The first barrel portion is provided with a first end surface that faces the second barrel portion, at an end of the first barrel portion opposite to the combustion chamber. The second barrel portion is provided with a second end surface that faces the first barrel portion, at an end of the second barrel portion on the side of the combustion chamber. The second end surface is provided with a projection. The inner circumferential surface of the housing main body is provided with a step portion where the locking portion can be locked. In the gas generator based on the second aspect of the present invention, while the projection is tilted outward in a radial direction of the housing main body, the projection and the first end surface abut on each other in the axial direction so that the connector portion is immovably fixed in the axial direction. In the gas generator based on the second aspect of the present invention, while the projection is tilted outward in the radial direction, the projection and the inner circumferential surface of the housing main body abut on each other in the radial direction so that the connector portion is immovably fixed in a circumferential direction of the housing main body.

Advantageous Effects of Invention

According to the present invention, a gas generator capable of achieving stable operations while achieving reduction in manufacturing cost and weight can be provided.

DESCRIPTION OF EMBODIMENTS

Figure 1:
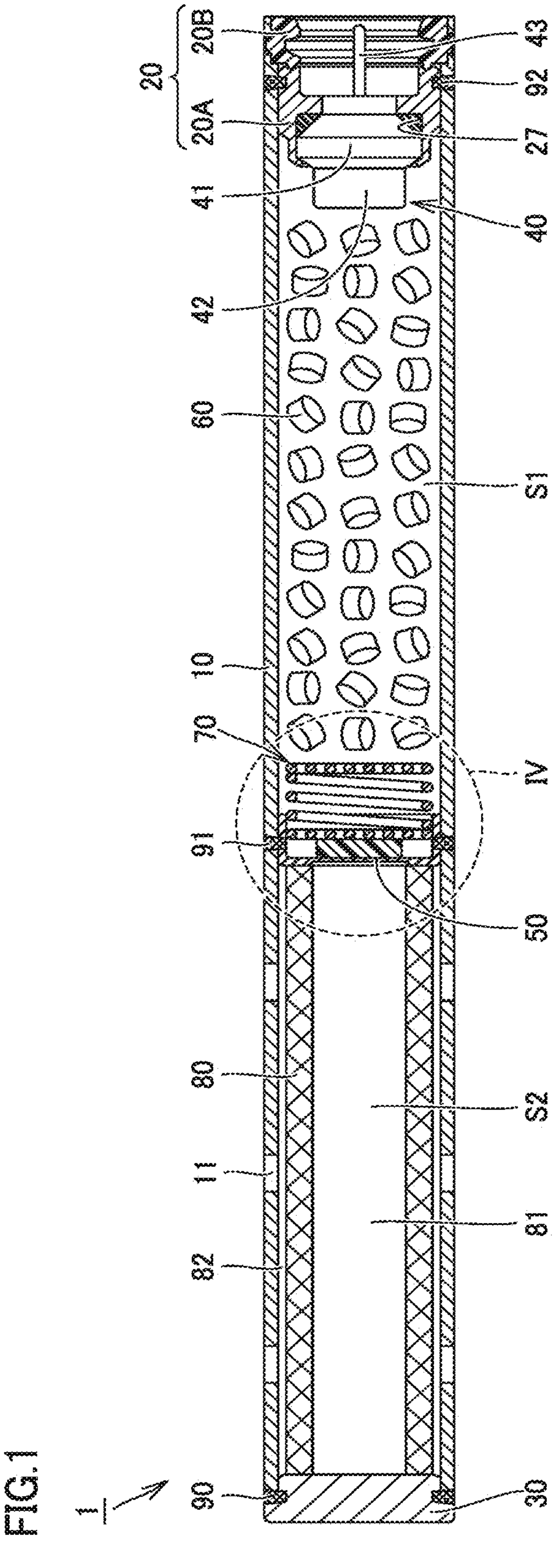
FIG. 1 is a schematic diagram of a cylinder type gas generator according to a first embodiment.

An embodiment of the present invention will be described hereinafter in detail with reference to the drawings. An embodiment shown below represents application of the present invention to a cylinder type gas generator incorporated in a side air bag apparatus. The same or common elements in an embodiment shown below have the same reference characters allotted in the drawings and description thereof will not be repeated.

First Embodiment

Figure 2:
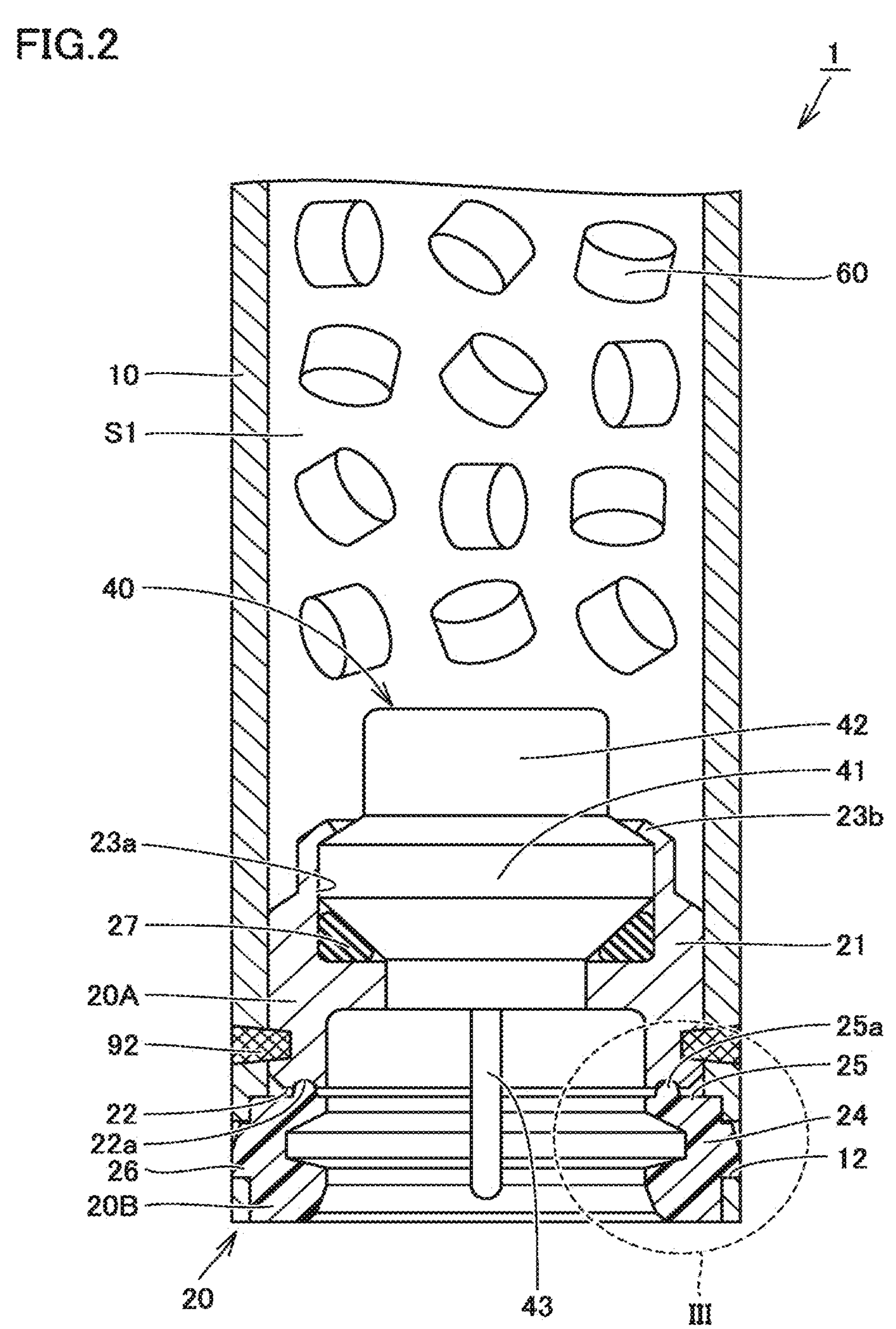
FIG. 2 is an enlarged cross-sectional view of a vicinity of an igniter shown in FIG. 1.
Figure 3:
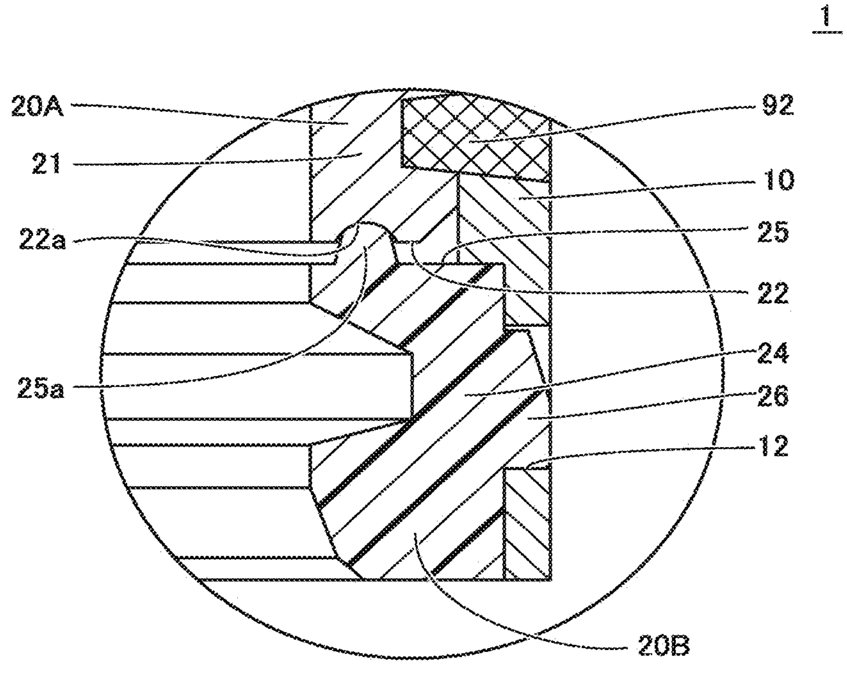
FIG. 3 is an enlarged cross-sectional view of a vicinity of a projection and a recess shown in FIG. 2.
Figure 4:
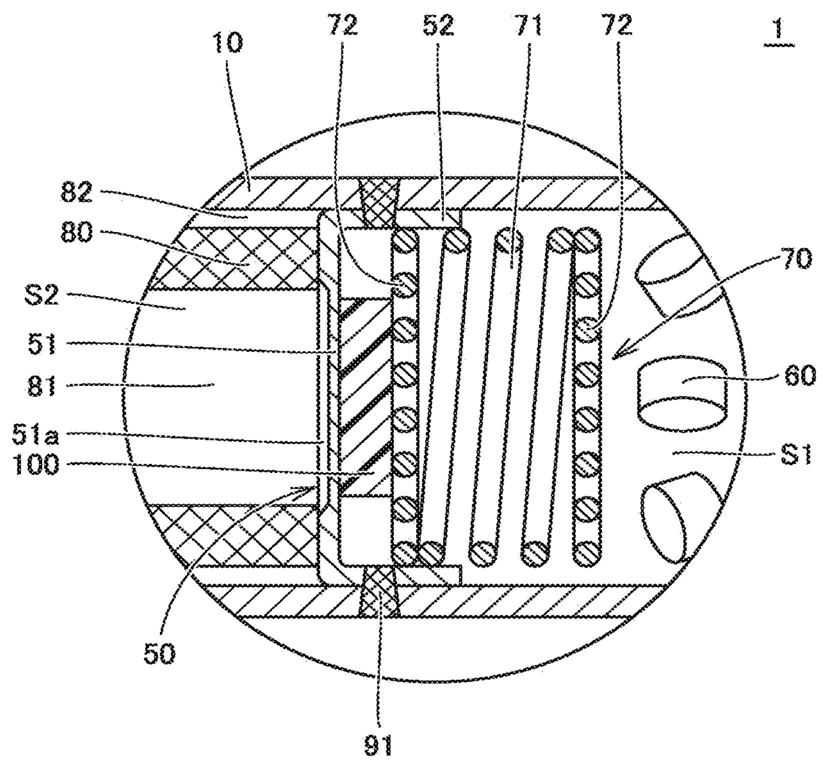
FIG. 4 is an enlarged cross-sectional view of a vicinity of a partition member shown in FIG. 1.
Figure 5:
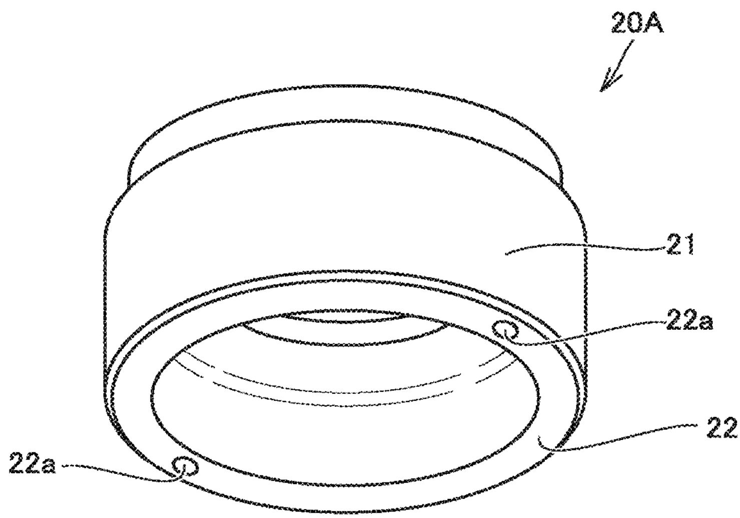
FIG. 5 is a perspective view of a holder portion shown in FIG. 1.
Figure 6:
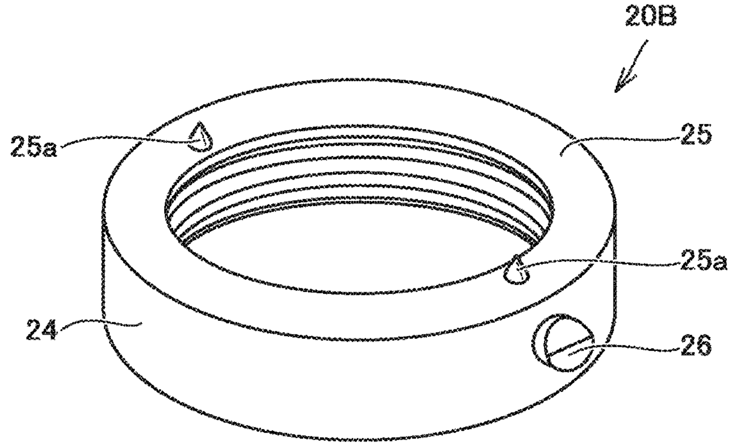
FIG. 6 is a perspective view of a connector portion shown in FIG. 1.

FIG. 1 is a schematic diagram of a cylinder type gas generator according to a first embodiment. FIG. 2 is an enlarged cross-sectional view of a vicinity of an igniter shown in FIG. 1. FIG. 3 is an enlarged cross-sectional view showing as being enlarged, an area III including a vicinity of a projection and a recess shown in FIG. 2. FIG. 4 is an enlarged cross-sectional view showing as being enlarged, an area IV including a vicinity of a partition member shown in FIG. 1. FIGS. 5 and 6 are perspective views of a holder portion and a connector portion shown in FIG. 1, respectively. A construction of a cylinder type gas generator 1 according to the present embodiment will initially be described with reference to FIGS. 1 to 6.

As shown in FIG. 1, cylinder type gas generator 1 has an elongated columnar outer geometry and has an elongated circular cylindrical housing having closed one and the other ends located in an axial direction. The housing includes a housing main body 10, a holder assembly 20, and a closing member 30.

An igniter 40, a partition member 50, a gas generating agent 60, a coil spring 70, and a filter 80 as internal components are accommodated in the housing constituted of housing main body 10, holder assembly 20, and closing member 30. In the housing, a gas generating agent accommodation chamber S1 where gas generating agent 60 and coil spring 70 among the internal components described above are accommodated and a filter chamber S2 where filter 80 is arranged are located.

In the description below, the internal space in cylinder type gas generator 1 including a space corresponding to gas generating agent accommodation chamber S1 described above and a space corresponding to a hollow portion 81 of filter 80 which will be described later in filter chamber S2 described above is referred to as a combustion chamber.

Housing main body 10 is made of an elongated circular cylindrical member which implements a circumferential wall portion of the housing and has an opening provided at each of opposing ends in the axial direction. Holder assembly 20 is formed from a cylindrical member including a hollow opening like a through hole which extends in a direction in parallel to the axial direction of housing main body 10, and includes a holder portion 20A and a connector portion 20B which will be described later. Closing member 30 is formed from a member substantially in a disc shape provided with a flange portion.

Housing main body 10 may be formed from a member made of metal such as stainless steel, iron steel, an aluminum alloy, or a stainless alloy or from a circularly cylindrically formed press-formed product by press-working of a rolled steel plate represented by SPCE. Alternatively, housing main body 10 may be formed from an electric resistance welded tube represented by STKM.

In particular, when housing main body 10 is formed from a press-formed product of a rolled steel plate or an electric resistance welded tube, housing main body 10 can be formed more inexpensively and readily and with much lighter weight than when the housing main body is formed from a member made of metal such as stainless steel or iron steel.

As shown in FIG. 2, a hole that penetrates in a radial direction of housing main body 10 is provided at one end where holder assembly 20 is to be assembled in the axial direction of circular cylindrical housing main body 10. A step portion 12 to which a locking portion 26 of connector portion 20B which will be described later can be locked is thus formed in an inner circumferential surface of housing main body 10. The number of holes and the number of step portions 12 defined thereby are not particularly restricted; a single hole or a single step portion may be provided, or a plurality of holes or a plurality of step portions may be provided. In cylinder type gas generator 1, two holes and two step portions 12 are arranged at positions in rotational symmetry through 180° when viewed along the axial direction of housing main body 10.

As shown in FIGS. 1 to 3, holder assembly 20 is fixed to housing main body 10 so as to close one axial opening end of housing main body 10. Specifically, while holder portion 20A of holder assembly 20 is located in one opening end of housing main body 10, holder portion 20A is fixed by being joined at a portion of contact between holder portion 20A and housing main body 10 or in the vicinity thereof. Connector portion 20B of holder assembly 20 is fixed to housing main body 10 by what is called snap fitting while connector portion 20B is pressed into one opening end of housing main body 10. Thus, one axial end of the housing is implemented by holder assembly 20. Details of a procedure of assembling holder assembly 20 will be described later.

As shown in FIG. 1, closing member 30 is fixed to housing main body 10 so as to close the other axial opening end of housing main body 10. Specifically, while a part of closing member 30 is located in the other opening end of housing main body 10, closing member 30 is fixed by being welded at a portion of contact between the flange portion of closing member 30 and housing main body 10 or in the vicinity thereof. The other axial end of the housing is thus implemented by closing member 30.

Closing member 30 is formed from a member made of metal such as stainless steel, iron steel, an aluminum alloy, or a stainless alloy.

In closing member 30 and housing main body 10 corresponding to the portion where the closing member is located, a welded portion 90 that extends along a circumferential direction of housing main body 10 is formed. Electron beam welding, laser welding, resistance welding, and the like can suitably be used for welding between closing member 30 and housing main body 10.

In an example where closing member 30 is thus fixed by being welded to housing main body 10, a gap between closing member 30 and housing main body 10 is buried and thus sealed by welded portion 90. Therefore, according to such a construction, hermeticity in that portion can be ensured.

A structure for assembly of closing member 30 to housing main body 10 is not limited to the assembly structure described above, and another assembly structure may be adopted. Alternatively, housing main body 10 and closing member 30 do not have to be separate members, and they may be implemented as one member in a shape of a cylinder with bottom.

As shown in FIGS. 1 and 2, igniter 40 is assembled to the above-described one axial end of the housing by being supported by holder assembly 20. Igniter 40 serves to burn gas generating agent 60 and is set to face a space in the housing.

Igniter 40 serves to initiate flame and it is also referred to as a squib. Igniter 40 includes a base 41, an ignition portion 42, and a pair of terminal pins 43. Base 41 is a part that holds ignition portion 42 and the pair of terminal pins 43 and is also fixed to holder assembly 20. Base 41 holds the pair of terminal pins 43 as the pair of terminal pins is inserted therethrough.

Ignition portion 42 contains an ignition agent that initiates flame by being ignited and burnt at the time of activation and a resistor (bridge wire) for ignition of the ignition agent. The pair of terminal pins 43 is connected to ignition portion 42 for ignition of the ignition agent.

More specifically, ignition portion 42 includes a squib cup formed like a cup. The resistor described above is attached to couple to each other, tip ends of the pair of terminal pins 43 inserted in the squib cup, and the ignition agent is loaded in the squib cup so as to surround the resistor or to be in proximity to the resistor. An enhancer agent may be loaded in ignition portion 42 as necessary.

Here, a Nichrome wire or a resistance wire made of an alloy containing platinum and tungsten is generally used as a resistor, and ZPP (zirconium potassium perchlorate), ZWPP (zirconium tungsten potassium perchlorate), lead tricinate, or the like is generally made use of as the ignition agent. A composition composed of metal powders/oxidizing agent represented by $B/KNO_3$, $B/NaNO_3$, or $Sr(NO_3)_2$, a composition composed of titanium hydride/potassium perchlorate, or a composition composed of B/5-aminotetrazole/potassium nitrate/molybdenum trioxide is employed as the enhancer agent.

Upon sensing collision, a prescribed amount of current flows in a resistor through terminal pin 43. As the prescribed amount of current flows in the resistor, Joule heat is generated in the resistor and the ignition agent starts burning. Thermal particles at a high temperature caused by burning cleave the squib cup where the ignition agent is accommodated. A time period from flow of a current in the resistor until activation of igniter 40 is generally not longer than 2 milliseconds in a case that the Nichrome wire is employed as the resistor.

Igniter 40 is fixed to holder assembly 20 while ignition portion 42 thereof projects toward the inside of the housing and a part thereof is arranged in the inside of the above-described hollow opening of holder assembly 20. Igniter 40 thus has ignition portion 42 located on a side of gas generating agent accommodation chamber S1 and has terminal pins 43 located opposite to the side of gas generating agent accommodation chamber S1. Details of a structure for fixing igniter 40 to holder assembly 20 will be described later.

As shown in FIGS. 1 and 4, partition member 50 is arranged at a prescribed position in the space in the housing. Partition member 50 is a member for partitioning the space in the housing into gas generating agent accommodation chamber S1 and filter chamber S2 in the axial direction.

Partition member 50 is in a shape of a circular cylinder with bottom, and formed from a member made of metal such as stainless steel, iron steel, an aluminum alloy, or a stainless alloy. Partition member 50 includes a separation wall portion 51 in a form of a flat plate arranged to be orthogonal to the axial direction of housing main body 10 and an annular wall portion 52 in a form of a cylindrical wall erected from a circumferential edge of separation wall portion 51 toward gas generating agent accommodation chamber S1. Partition member 50 is arranged such that a main surface on an outer side of separation wall portion 51 abuts on filter 80 and an outer circumferential surface of annular wall portion 52 abuts on the inner circumferential surface of housing main body 10.

A score 51*a* is provided in a main surface of separation wall portion 51 which abuts on filter 80. Score 51*a* serves to provide an opening as a result of rupture of separation wall portion 51 with increase in internal pressure in gas generating agent accommodation chamber S1 as a result of burning of gas generating agent 60, and it is provided, for example, as a plurality of grooves provided to radially intersect with one another. Score 51*a* is provided in a portion in filter 80 opposed to hollow portion 81.

Partition member 50 is fixed by being joined to housing main body 10 while it is located in housing main body 10. More specifically, partition member 50 is fixed by being press-fitted into housing main body 10 and being welded at a portion of contact between annular wall portion 52 of partition member 50 and housing main body 10 or in the vicinity thereof.

A welded portion 91 that extends along the circumferential direction of housing main body 10 is thus formed in partition member 50 and the portion of housing main body 10 where partition member 50 is located. Electron beam welding, laser welding, resistance welding, and the like can suitably be used for welding between partition member 50 and housing main body 10.

When partition member 50 is thus fixed to housing main body 10 by welding, a gap between partition member 50 and housing main body 10 is buried and thus sealed by welded portion 91. Therefore, according to such a construction, airtightness in that portion can be ensured.

The method of fixing partition member 50 to housing main body 10 is not limited to the fixing method using press-fitting and welding described above, and another fixing method may be used. Airtightness between partition member 50 and housing main body 10 in that case can be ensured by providing an O ring or a sealing tape at an appropriate position.

As shown in FIGS. 1 and 4, in a space inside the housing, gas generating agent 60, coil spring 70, and an autoignition agent 100 are arranged in a space lying between holder assembly 20 and partition member 50 (that is, gas generating agent accommodation chamber S1).

Among these, coil spring 70 is arranged on a side where partition member 50 is located (that is, a side of above-described the other axial end of the housing in gas generating agent accommodation chamber S1), and gas generating agent 60 is arranged between holder assembly 20 and coil spring 70. Autoignition agent 100 is arranged between partition member 50 and coil spring 70 to abut on partition member 50.

Gas generating agent 60 is an agent which is ignited by thermal particles produced as a result of activation of igniter 40 and produces gas as it burns. A non-azide-based gas generating agent is preferably employed as gas generating agent 60, and gas generating agent 60 is formed as a molding generally containing a fuel, an oxidizing agent, and an additive.

For the fuel, for example, a triazole derivative, a tetrazole derivative, a guanidine derivative, an azodicarbonamide derivative, a hydrazine derivative, or the like, or combination thereof is made use of. Specifically, for example, nitroguanidine, guanidine nitrate, cyanoguanidine, 5-aminotetrazole, and the like are suitably made use of.

As the oxidizing agent, for example, basic metal salt such as basic copper nitrate and basic copper carbonate, perchlorate such as ammonium perchlorate or potassium perchlorate, nitrate containing cations selected from an alkali metal, an alkali earth metal, a transition metal, and ammonia, or the like is made use of. As the nitrate, for example, sodium nitrate, potassium nitrate, or the like is suitably made use of.

As the additive, a binder, a slag formation agent, a combustion modifier, or the like is exemplified. As the binder, for example, an organic binder such as metal salt of carboxymethyl cellulose and stearate, or an inorganic binder such as synthetic hydrotalcite and Japanese acid clay can suitably be made use of. As the slag formation agent, silicon nitride, silica, Japanese acid clay, or the like can suitably be made use of. As the combustion modifier, a metal oxide, ferrosilicon, activated carbon, graphite, or the like can suitably be made use of.

A shape of a molding of gas generating agent 60 includes various shapes such as a particulate shape including a granule, a pellet, and a column, and a disc shape. Among columnar moldings, a molding with holes having through holes in the molding (such as a cylindrical shape with a single hole or a cylindrical shape with multiple holes) is also made use of. These shapes are preferably selected as appropriate depending on specifications of an air bag apparatus in which cylinder type gas generator 1 is incorporated, and for example, a shape optimal for the specifications is preferably selected by selecting a shape allowing change over time of a rate of generation of gas during burning of gas generating agent 60. Furthermore, in addition to a shape of gas generating agent 60, a size of a molding or an amount thereof for filling is preferably selected as appropriate, in consideration of a linear burning velocity, a pressure exponent, or the like of gas generating agent 60.

Coil spring 70 is provided for the purpose of prevention of gas generating agent 60 formed from a molding from being crushed by vibration or the like, and includes a circular cylindrical portion 71 and a pair of pressing portions 72 located at opposing ends thereof, circular cylindrical portion 71 and the pair of pressing portions 72 being formed by bending a metal wire rod.

Circular cylindrical portion 71 is formed from a part like a spring obtained by helically winding a metal wire rod. One of the pair of pressing portions 72 is provided at one end of circular cylindrical portion 71 and the other thereof is provided at the other end of circular cylindrical portion 71. The pair of pressing portions 72 is constructed to be substantially in a shape of a disc as a whole, for example, by arrangement of the metal wire rod substantially in parallel at prescribed intervals or helical arrangement of the metal wire rod at prescribed intervals. One of the pair of pressing portions 72 is in contact with gas generating agent 60 and the other thereof is in contact with autoignition agent 100.

Coil spring 70 is compressed by being sandwiched between autoignition agent 100 and gas generating agent 60. Therefore, gas generating agent 60 is elastically biased by coil spring 70 toward holder assembly 20 (that is, toward above-described one end of the housing), so that gas generating agent 60 is prevented from moving in the inside of gas generating agent accommodation chamber S1. Therefore, according to such a construction, gas generating agent 60 formed from a molding can be prevented from being crushed by vibration or the like.

In assembly of coil spring 70, coil spring 70 is compressed by being sandwiched between autoignition agent 100 and gas generating agent 60, so that variation in dimension of various components accommodated in the housing can also be absorbed by coil spring 70.

Autoignition agent 100 is composed of a pellet formed into a substantially columnar shape with a flat profile. Autoignition agent 100 is arranged opposite (that is, on a side of filter 80) to a side where gas generating agent 60 is located when viewed from coil spring 70, and held by being sandwiched between separation wall portion 51 of partition member 50 and coil spring 70. Autoignition agent 100 is thus separated from gas generating agent 60 by coil spring 70.

Autoignition agent 100 is an agent that self-ignites independently of activation of igniter 40. More specifically, autoignition agent 100 self-ignites at a temperature lower than a temperature of self-ignition of gas generating agent 60, and it serves not to induce an abnormal operation due to external heating of cylinder type gas generator 1 in case of fire in a vehicle or the like equipped with an air bag apparatus incorporating cylinder type gas generator 1.

As shown in FIG. 1, in the space in the housing, filter 80 is arranged in the space (that is, filter chamber S2) lying between closing member 30 and partition member 50. Filter 80 is formed from a circular cylindrical member having hollow portion 81 extending in a direction in parallel to the axial direction of housing main body 10, and has one axial end surface abutting on closing member 30 and has the other axial end surface abutting on separation wall portion 51 of partition member 50.

Filter 80 functions as cooling means for cooling gas by removing heat from the gas at a high temperature when the gas produced as a result of burning of gas generating agent 60 passes through this filter 80 and also functions as removal means for removing slag (residues) or the like contained in the gas. As described above, by making use of filter 80 formed from a circular cylindrical member, a flow resistance against gas which flows through filter chamber S2 at the time of activation is suppressed and an efficient flow of the gas can be achieved.

A filter formed from an aggregate of metal wire rods or metal mesh materials suitably made of stainless steel or iron steel can be made use of as filter 80. Specifically, a wire gauze of stocking stitch, a plain-woven wire gauze, an aggregate of crimped metal wire rods, or a material obtained by compressing the former with the use of a press can be made use of.

Alternatively, a material obtained by winding a perforated metal plate can also be made use of as filter 80. In this case, as the perforated metal plate, for example, expanded metal obtained by making staggered cuts in a metal plate and providing holes by widening the cuts to thereby work the metal plate in a mesh, hook metal obtained by perforating a metal plate and collapsing burrs caused around a periphery of the hole for flattening, or the like can be made use of.

Filter 80 is arranged at a distance from a portion of housing main body 10 that defines filter chamber S2 so as to provide a gap portion 82 having a prescribed size between filter 80 and the portion of housing main body 10. Provision of this gap portion 82 allows passage of gas generated by combustion of gas generating agent 60 through substantially the entire area of filter 80 and improves efficiency in use of filter 80.

A plurality of gas discharge openings 11 are provided along the circumferential direction and the axial direction in a portion of housing main body 10 defining filter chamber S2. The plurality of gas discharge openings 11 serve for guiding gas which has passed through filter 80 to the outside of the housing.

An operation of cylinder type gas generator 1 according to the present embodiment when it is activated will now be described with reference to FIG. 1.

With reference to FIG. 1, when a vehicle on which cylinder type gas generator 1 according to the present embodiment is mounted collides, collision is sensed by collision sensing means separately provided in the vehicle and igniter 40 is activated based thereon by current feed caused by a control unit separately provided in the vehicle.

When igniter 40 is activated, the ignition agent or the enhancer agent in addition thereto burns. Then, a pressure in ignition portion 42 increases, which cleaves the squib cup of ignition portion 42, and thermal particles resulting from burning of the ignition agent or the enhancer agent in addition thereto flow to the outside of ignition portion 42. Thermal particles which have reached gas generating agent 60 burn gas generating agent 60 so that a large amount of gas is produced in gas generating agent accommodation chamber S1.

Accordingly, a pressure in gas generating agent accommodation chamber S1 increases and an internal pressure in gas generating agent accommodation chamber S1 reaches a prescribed pressure, which causes a rupture in a portion of partition member 50 where score 51*a* is provided. An opening is thus provided in a portion of partition member 50 opposed to hollow portion 81 of filter 80, and gas generating agent accommodation chamber S1 and filter chamber S2 communicate with each other through the opening.

Accordingly, gas produced in gas generating agent accommodation chamber S1 flows into filter chamber S2 through the opening provided in partition member 50. The gas which has flowed into filter chamber S2 flows along the axial direction through hollow portion 81 of filter 80, thereafter changes its direction toward a radial direction, and passes through filter 80. At that time, heat is removed through filter 80 and the gas is cooled, and slag contained in the gas is removed by filter 80.

The gas which has passed through filter 80 is discharged to the outside of the housing through gas discharge opening 11 provided in housing main body 10. The discharged gas is introduced into an air bag provided adjacently to cylinder type gas generator 1 to thereby expand and develop the air bag.

As described above, cylinder type gas generator 1 according to the present embodiment includes holder assembly 20 as a part of the housing, and holder assembly 20 is attached to the opening end on the side of the above-described one end of housing main body 10. The construction of holder assembly 20 and the structure for fixing igniter 40 to holder assembly 20 will be described in detail below with reference to FIGS. 1 to 3, 5, and 6.

As shown in FIGS. 1 to 3, 5, and 6, holder assembly 20 includes holder portion 20A made of metal, holder portion 20A being located on the side of gas generating agent accommodation chamber S1, and connector portion 20B made of resin, connector portion 20B being located opposite to the side of gas generating agent accommodation chamber S1. Holder assembly 20 is composed as a component integrated by assembly of holder portion 20A and connector portion 20B to each other in advance. Holder assembly 20 is attached to the above-described one opening end of housing main body 10.

As shown in FIGS. 1 to 3 and 5, holder portion 20A is formed from a member substantially in a shape of a disc with a flat profile, the member including in its central portion, a through portion that extends along the axial direction, and holder portion 20A includes a first barrel portion 21 in a cylindrical shape. First barrel portion 21 is provided with a first end surface 22 that faces a second barrel portion 24 of connector portion 20B which will be described later, at an end opposite to gas generating agent accommodation chamber S1.

First end surface 22 is provided with a recess 22*a* substantially in a hemispherical shape. Recess 22*a* is a portion that receives a projection 25*a* of connector portion 20B which will be described later. Though the number of recesses 22*a* is not particularly restricted, recesses 22*a* as many as projections 25*a* are preferably provided. In cylinder type gas generator 1, two recesses 22*a* are arranged at positions in rotational symmetry through 180° when viewed along the axial direction of holder portion 20A. The shape of recess 22*a* is not particularly limited to the substantially hemispherical shape but can be modified as appropriate in conformity with the shape of projection 25*a*.

Holder portion 20A is inserted in housing main body 10 such that the axial direction thereof is in parallel to the axial direction of housing main body 10. The through portion provided in holder portion 20A thus defines a part of the above-described hollow opening of holder assembly 20.

Holder portion 20A is a member that receives and holds igniter 40. Holder portion 20A is provided with an accommodation portion 23*a* in a recessed shape at an axial end on the side of gas generating agent accommodation chamber S1 for receiving igniter 40. Accommodation portion 23*a* communicates with the through portion provided in holder portion 20A. A swaging portion 23*b* is provided at an end of holder portion 20A on the side of gas generating agent accommodation chamber S1 to surround accommodation portion 23*a*. Swaging portion 23*b* is a part for fixing by swaging igniter 40 to holder portion 20A.

Holder portion 20A is formed from a member made of metal such as stainless steel, iron steel, an aluminum alloy, or a stainless alloy.

As shown in FIGS. 2 and 3, igniter 40 is fixed to holder portion 20A with base 41 thereof being accommodated in accommodation portion 23*a* of holder portion 20A. Specifically, igniter 40 is fixed to holder portion 20A in such a manner that base 41 is inserted in accommodation portion 23*a* of holder portion 20A, base 41 abuts on a bottom surface of accommodation portion 23*a*, and swaging portion 23*b* provided in holder portion 20A is bent in this state. Igniter 40 is thus held by holder portion 20A.

A sealing member 27 formed from an O ring or the like is interposed between holder portion 20A and igniter 40 so as to bury and seal a gap between holder portion 20A and igniter 40. According to such a construction, airtightness in that portion can therefore be ensured. The method of fixing igniter 40 is not limited to the fixing method with the use of swaging portion 23*b* described above and another fixing method may be used.

As shown in FIGS. 1 to 3 and 6, connector portion 20B is formed from a member substantially in a shape of a circular cylinder, the member including in a central portion thereof, a through portion that extends along the axial direction, and includes second barrel portion 24 in a cylindrical shape and locking portion 26 in a shape of a hook that projects from second barrel portion 24 outward in the radial direction of connector portion 20B. The number of locking portions 26 is not particularly restricted; a single locking portion or a plurality of locking portions may be provided. In cylinder type gas generator 1, two locking portions are arranged at positions in rotational symmetry through 180° when viewed along the axial direction of connector portion 20B.

Second barrel portion 24 is provided with a second end surface 25 that faces first barrel portion 21 of holder portion 20A, at an end on the side of gas generating agent accommodation chamber S1. Second end surface 25 is provided with a projection 25*a* substantially in a shape of a cone.

Projection 25*a* abuts on recess 22*a* of holder portion 20A by being pressed against recess 22*a*. More preferably, projection 25*a* is in pressure contact with recess 22*a* as being collapsed, by being pressed against recess 22*a*. The number of projections 25*a* is not particularly restricted; a single projection or a plurality of projections may be provided. In cylinder type gas generator 1, two projections 25*a* are arranged at positions in rotational symmetry through 180° when viewed along the axial direction of connector portion 20B. The shape of projection 25*a* is not particularly limited to the shape of the substantial cone but can be modified as appropriate, for example, to a shape of a substantial prism, a shape of a substantial frustum of a pyramid, or a shape of a substantial hemisphere.

Connector portion 20B is inserted in housing main body 10 such that the axial direction thereof is in parallel to the axial direction of housing main body 10. The through portion provided in connector portion 20B thus defines a part of the above-described hollow opening of holder assembly 20.

Connector portion 20B serves to receive a connector connected to terminal pin 43 of igniter 40. Terminal pin 43 of igniter 40 is arranged in the inside of connector portion 20B. The through portion provided in connector portion 20B described above defines a part for receiving the connector.

More specifically, in cylinder type gas generator 1, igniter 40 should electrically be connected to a control unit (not shown) of a vehicle or the like provided outside, and a harness is normally used for this electrical connection. A male connector is attached to a tip end of the harness, and connector portion 20B should be provided with a female connector connectable to the male connector. The through portion provided in connector portion 20B implements the female connector.

As the male connector of the harness is inserted in the through portion that functions as the female connector, a core of the harness and terminal pin 43 electrically conduct to each other and thus wired connection between igniter 40 and the control unit of the vehicle or the like is established.

Though a material for connector portion 20B is not particularly restricted, for example, a nylon-based resin as represented by nylon 6, nylon 66, and 6 nylon or 66 nylon filled with a glass filler, a polyacetal (POM) resin, a polycarbonate (PC) resin, a polyphenylene sulfide (PPS) resin, a polybutylene terephthalate (PBT) resin, or the like can suitably be employed.

Figure 7:
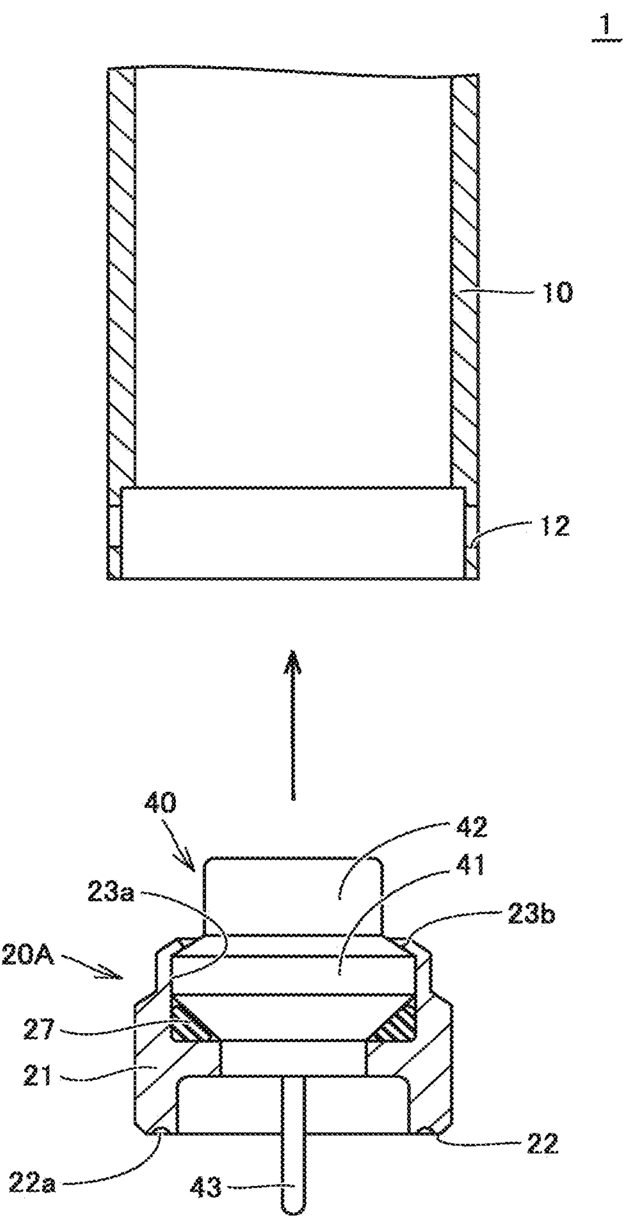
FIG. 7 is a cross-sectional view showing a procedure of assembling a holder assembly shown in FIG. 1.
Figure 8:
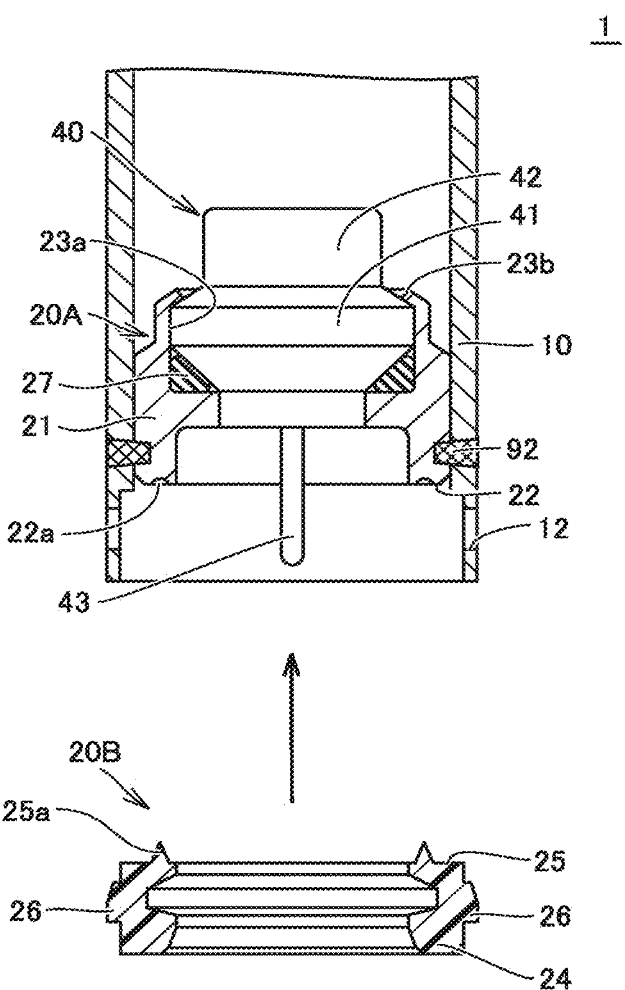
FIG. 8 is a cross-sectional view showing the procedure of assembling the holder assembly shown in FIG. 1.

FIGS. 7 and 8 are cross-sectional views showing a procedure of assembly of the holder assembly in the cylinder type gas generator shown in FIG. 1. The procedure of assembly of holder assembly 20 in cylinder type gas generator 1 according to the present embodiment will now be described with reference to FIGS. 7 and 8.

In assembly of holder assembly 20 to housing main body 10, initially, as shown in FIG. 7, an assembly obtained by assembly of igniter 40 to holder portion 20A is prepared, which is in turn inserted in one opening end of housing main body 10. Holder portion 20A and housing main body 10 are then fixed by being welded in a portion of contact therebetween or in the vicinity thereof.

A welded portion 92 that extends along the circumferential direction of housing main body 10 is thus formed in the portion of housing main body 10 where holder portion 20A is located and holder portion 20A. Electron beam welding, laser welding, resistance welding, and the like can suitably be used for welding between holder portion 20A and housing main body 10.

In an example where holder portion 20A is thus fixed by being welded to housing main body 10, a gap between holder portion 20A and housing main body 10 is buried and thus sealed by welded portion 92. Therefore, according to such a construction, airtightness in that portion can be ensured.

As shown in FIG. 8, connector portion 20B is then assembled to holder portion 20A. Specifically, connector portion 20B is press-fitted to one opening end of housing main body 10. Projection 25*a* of connector portion 20B thus deforms so that projection 25*a* and recess 22*a* in holder portion 20A abut on each other. Furthermore, while projection 25*a* and recess 22*a* abut on each other, locking portion 26 of connector portion 20B is fixed to step portion 12 provided in the inner circumferential surface of housing main body 10 by being locked thereto. Preferably, projection 25*a* deforms as being collapsed so that projection 25*a* and recess 22*a* are in pressure contact with each other.

Through a series of steps described above, connector portion 20B is assembled to holder portion 20A to which igniter 40 has been assembled, and assembly of holder assembly 20 composed of holder portion 20A and connector portion 20B to housing main body 10 is completed. The opening end on the side of above-described one end of housing main body 10 is thus closed by holder assembly 20.

According to such a construction, cylinder type gas generator 1 that can achieve stable operations can be provided.

Specifically, in cylinder type gas generator 1 according to the present embodiment, as described above, while projection 25*a* deforms and elastic resilience is produced therein, projection 25*a* and recess 22*a* abut on each other in the axial direction of holder portion 20A and connector portion 20B. Movement of connector portion 20B toward gas generating agent accommodation chamber S1 in the axial direction (that is, movement upward in FIG. 3) is thus restricted and connector portion 20B is elastically biased toward the side opposite to gas generating agent accommodation chamber S1 in the axial direction.

In this state, connector portion 20B is fixed by locking of locking portion 26 to step portion 12 of housing main body 10. Locking portion 26 and step portion 12 thus abut on each other in the axial direction, and consequently, connector portion 20B is immovably fixed in the axial direction thereof.

Furthermore, in cylinder type gas generator 1, while projection 25*a* deforms and elastic resilience is produced therein, projection 25*a* and recess 22*a* abut on each other in the circumferential direction of holder portion 20A and connector portion 20B. Connector portion 20B is thus immovably fixed in the circumferential direction thereof.

Namely, in cylinder type gas generator 1 according to the present embodiment, connector portion 20B is immovably fixed in both of the axial direction and the circumferential direction thereof so that wobbling of connector portion 20B in these directions is suppressed.

Therefore, since unintended cancellation due to wobbling of connector portion 20B, of short-circuiting of terminal pin 43 of igniter 40 by the shorting clip inserted in connector portion 20B or electrical conduction between the core of the harness inserted in connector portion 20B and terminal pin 43 is effectively prevented, cylinder type gas generator 1 that can achieve stable operations can be provided.

Furthermore, in cylinder type gas generator 1 according to the present embodiment, the holder which has conventionally been composed of a single component made of metal is composed of holder assembly 20 which is a composite component of holder portion 20A made of metal and connector portion 20B made of resin, so that an amount of use of a metal material can drastically be reduced and accordingly the weight can significantly be reduced. In addition, works at high accuracy that have been required in an example where the holder is composed of a single component made of metal are not required, and furthermore, the construction of the holder is significantly simplified. In this aspect as well, cost for a material and cost for working can be reduced.

Therefore, with cylinder type gas generator 1 according to the present embodiment, stable operations can be achieved while manufacturing cost and a weight are reduced as compared with those in the conventional example.

In cylinder type gas generator 1 according to the present embodiment, connector portion 20B is provided with two projections 25*a*, each of which abuts on corresponding recess 22*a* in holder portion 20A. Thus, as compared with an example where only a single projection 25*a* is provided, wobbling of connector portion 20B described above can more reliably be prevented.

First Modification

Figure 9:
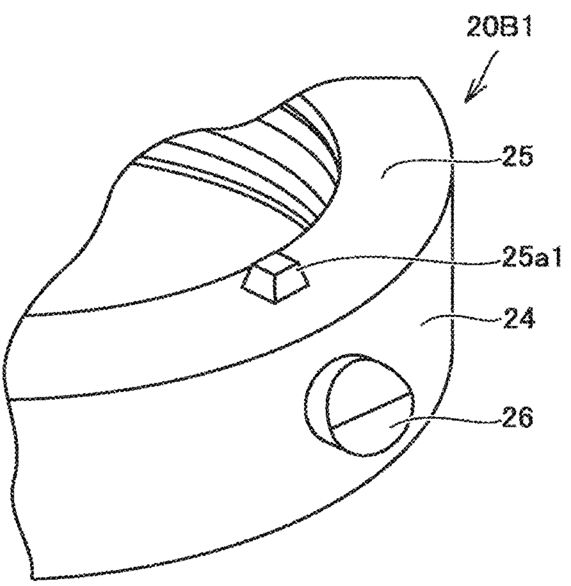
FIG. 9 is a perspective view showing a shape of a projection of a connector portion according to a first modification.

FIG. 9 is a perspective view showing a shape of a connector portion of a cylinder type gas generator according to a first modification based on the first embodiment described above and FIG. 10 is a cross-sectional view showing a procedure of assembling a holder assembly according to the first modification. A cylinder type gas generator 1A according to the first modification will be described below with reference to FIGS. 9 and 10. The procedure of assembling the holder assembly according to the first modification is basically similar to the procedure of assembling the holder assembly according to the first embodiment described above.

Figure 10:
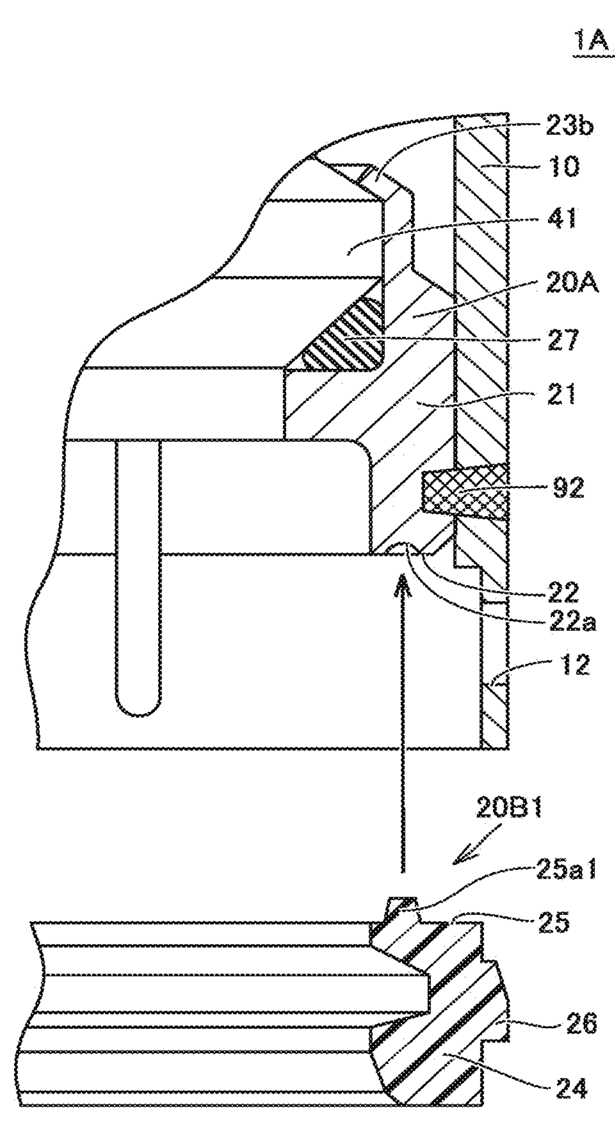
FIG. 10 is a cross-sectional view showing a procedure of assembling a holder assembly according to the first modification.

As shown in FIGS. 9 and 10, cylinder type gas generator 1A according to the first modification is different from cylinder type gas generator 1 according to the first embodiment described above only in shape of a projection 25*a*1 of a connector portion 20B1.

Specifically, in connector portion 20B1 according to the first modification, projection 25*a*1 is substantially in a shape of a frustum of a quadrangular pyramid decreasing in cross-sectional shape toward gas generating agent accommodation chamber S1.

According to such a construction, projection 25*a*1 of connector portion 20B1 and recess 22*a* in holder portion 20A abut on each other at four locations in the circumferential direction of holder portion 20A and connector portion 20B1. Therefore, according to such a construction, in addition to the effect described in the first embodiment described above, wobbling in the circumferential direction of connector portion 20B1 can more reliably be prevented.

Second Modification

Figure 11:
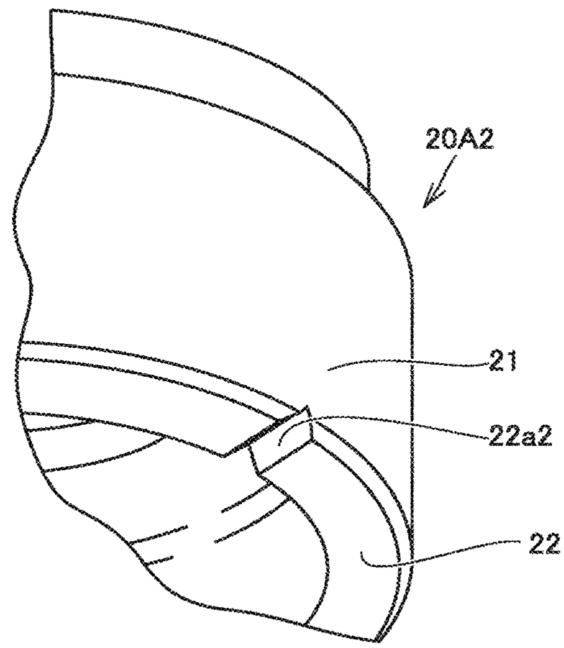
FIG. 11 is a perspective view showing a shape of a recess in a holder portion according to a second modification.
Figure 12:
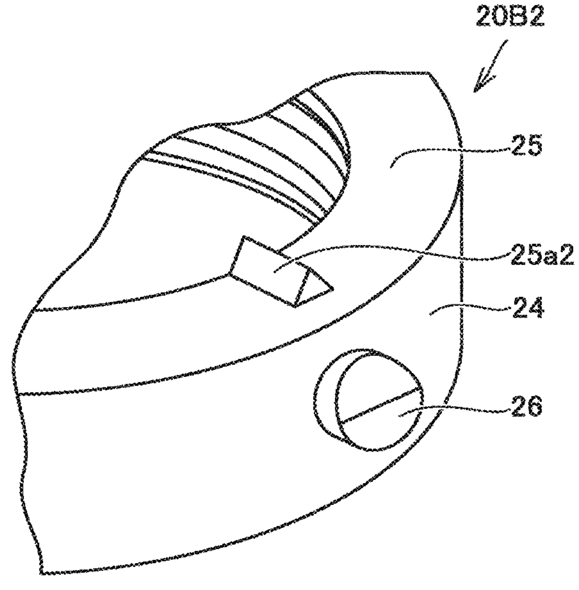
FIG. 12 is a perspective view showing a shape of a projection of a connector portion according to the second modification.
Figure 13:
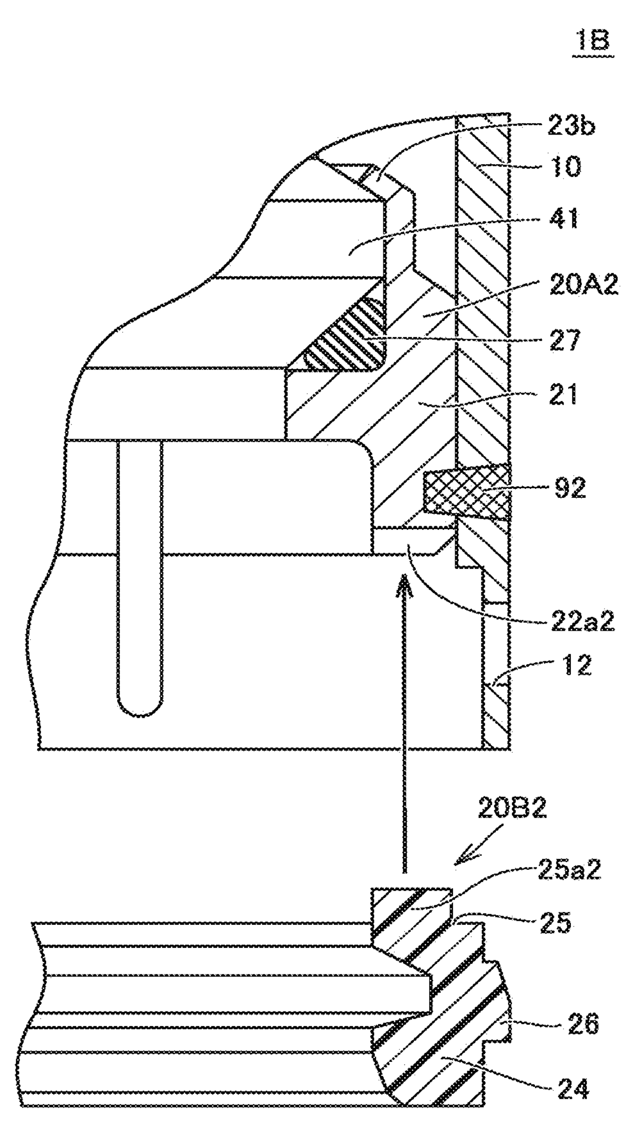
FIG. 13 is a cross-sectional view showing a procedure of assembling a holder assembly according to the second modification.

FIGS. 11 and 12 are perspective views showing shapes of a recess in a holder portion and a projection in a connector portion of a cylinder type gas generator according to a second modification based on the first embodiment described above, respectively. FIG. 13 is a cross-sectional view showing a procedure of assembling a holder assembly according to the second modification. A cylinder type gas generator 1B according to the second modification will be described below with reference to FIGS. 11 to 13. The procedure of assembling the holder assembly according to the second modification is basically similar to the procedure of assembling the holder assembly according to the first embodiment described above.

As shown in FIGS. 11 to 13, cylinder type gas generator 1B according to the second modification is different from cylinder type gas generator 1 according to the first embodiment described above in shape of a recess 22*a*2 in a holder portion 20A2 and shape of a projection 25*a*2 of a connector portion 20B2.

Specifically, in holder portion 20A2 according to the second modification, recess 22*a*2 is defined by a V-shaped groove that extends along a direction orthogonal to the circumferential direction of holder portion 20A2. In connector portion 20B2 according to the second modification, projection 25*a*2 is in a shape of a triangular prism that extends along a direction orthogonal to the circumferential direction of connector portion 20B2.

According to such a construction, projection 25*a*2 and recess 22*a*2 abut on each other while they are in surface contact with each other at two locations. According to such a construction, friction resistance caused between projection 25*a*2 and recess 22*a*2 is drastically higher than in an example where they are in point contact with each other. Therefore, in addition to the effect described in the first embodiment above, wobbling in the circumferential direction of connector portion 20B2 can more reliably be prevented.

Second Embodiment

Figure 14:
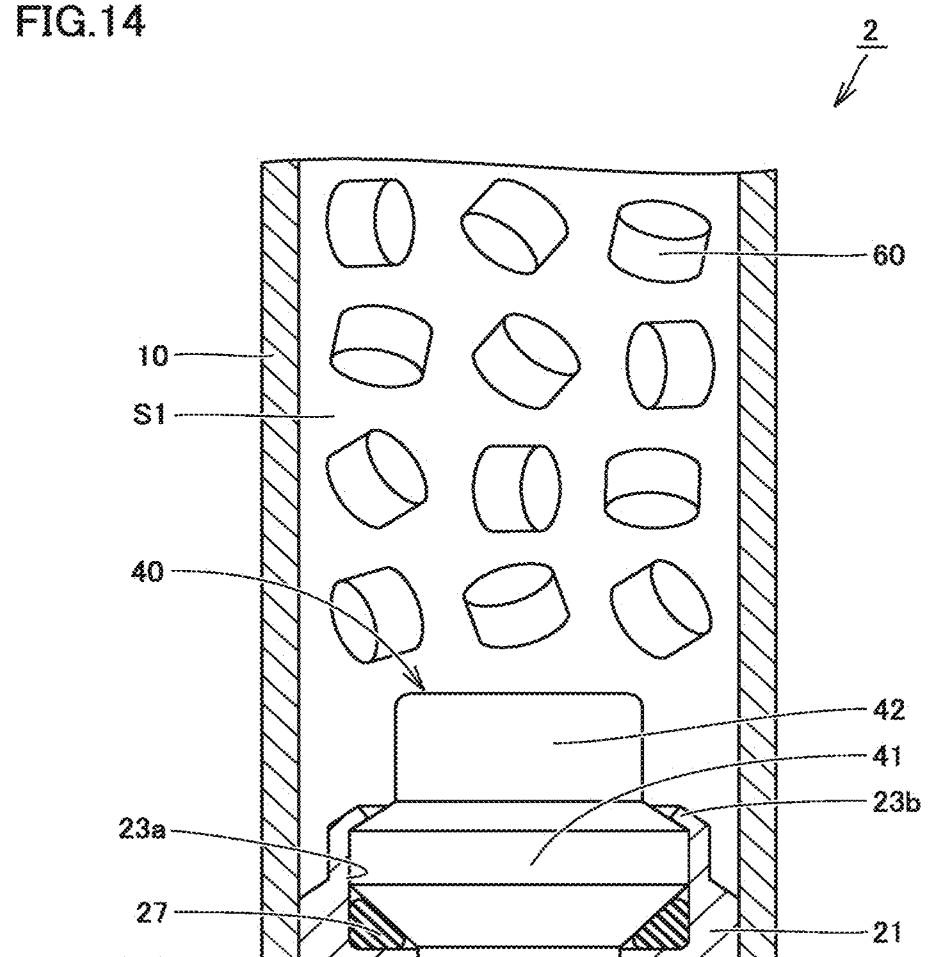
FIG. 14 is an enlarged cross-sectional view of a vicinity of the igniter of a cylinder type gas generator according to a second embodiment.
Figure 15:
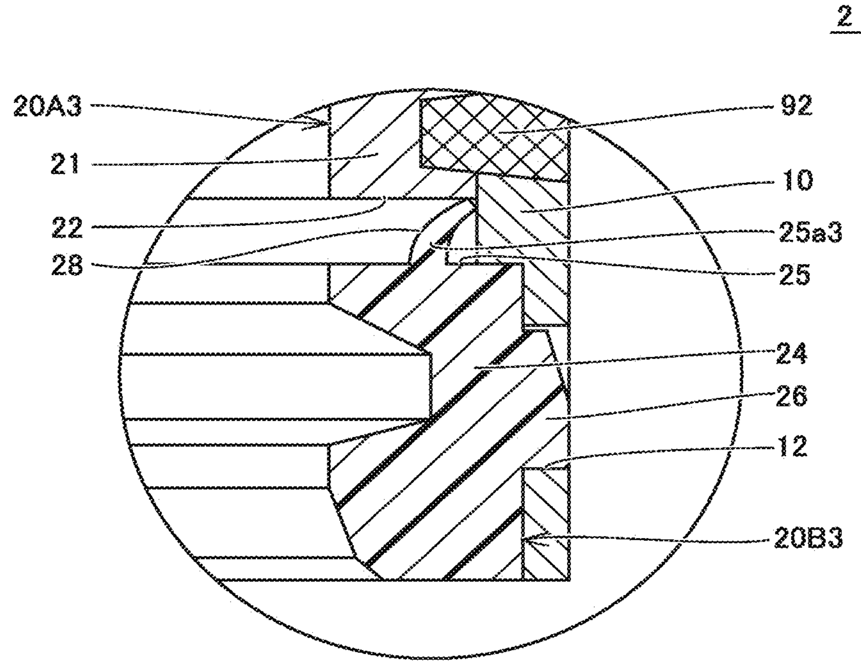
FIG. 15 is an enlarged cross-sectional view of a vicinity of a projection and a recess shown in FIG. 14.
Figure 16:
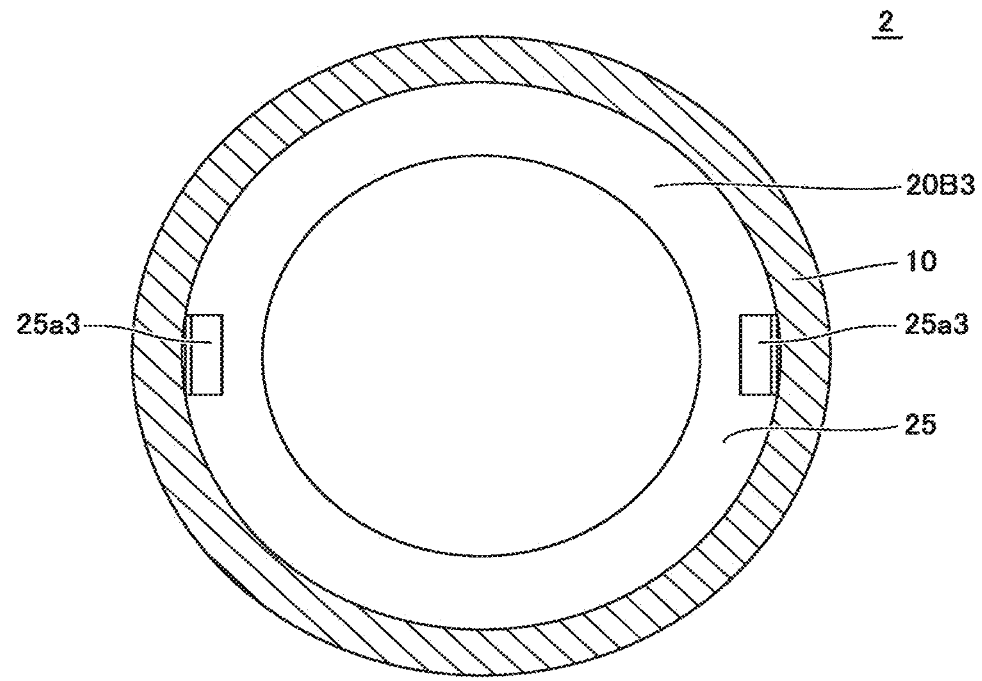
FIG. 16 is a plan view showing a projection of a connector portion shown in FIG. 14.
Figure 17:
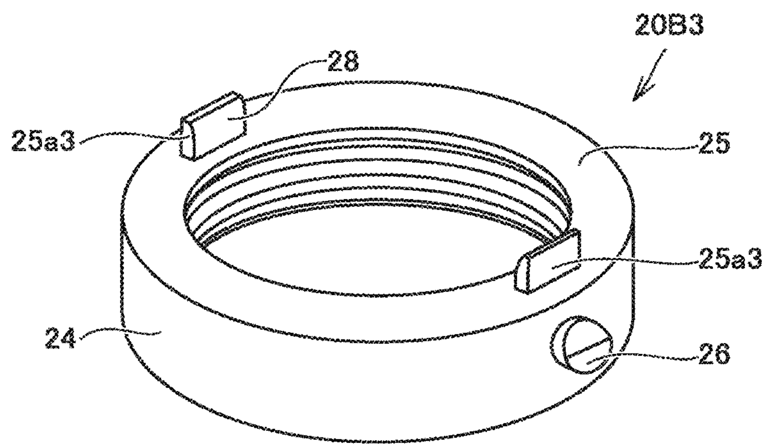
FIG. 17 is a perspective view of the connector portion shown in FIG. 14.
Figure 18:
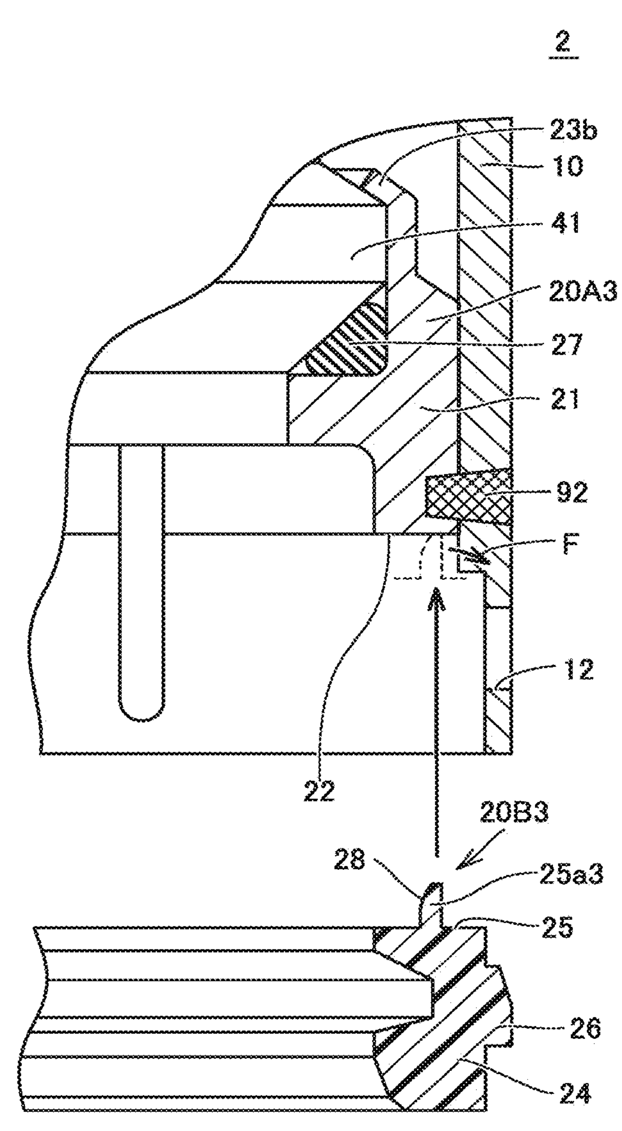
FIG. 18 is a cross-sectional view showing a procedure of assembling a holder assembly according to the second embodiment.

FIG. 14 is an enlarged cross-sectional view of a vicinity of the igniter of a cylinder type gas generator according to a second embodiment. FIG. 15 is an enlarged cross-sectional view of an area XV including the vicinity of a projection of a connector portion shown in FIG. 14. FIG. 16 is a plan view showing the projection of the connector portion shown in FIG. 14 and FIG. 17 is a perspective view of the connector portion. FIG. 18 is a cross-sectional view showing a procedure of assembling a holder assembly according to the second embodiment. A cylinder type gas generator 2 according to the second embodiment will be described below with reference to FIGS. 14 to 18. FIG. 16 shows a connector portion 20B3 in a plan view and shows a portion of housing main body 10 in contact with a projection 25*a*3 of connector portion 20B3 in a schematic cross-sectional view. The procedure of assembling the holder assembly according to the second embodiment is basically similar to the procedure of assembling the holder assembly according to the first embodiment described above.

As shown in FIGS. 14 to 16, cylinder type gas generator 2 according to the present embodiment is different from cylinder type gas generator 1 according to the first embodiment described above in shape of projection **25*a*3 of connector portion 20B3. Cylinder type gas generator 2 according to the present embodiment is different from cylinder type gas generator 1 according to the first embodiment also in that recess 22*a* is not provided in a holder portion 20A3**.

Specifically, projection **25*a*3 of connector portion 20B3 according to the second embodiment is substantially in a shape of a parallelepiped that extends along a tangential direction of second barrel portion 24 when viewed along the axial direction of connector portion 20B3. In a side surface of a portion of projection 25*a*3 located on an inner side in the radial direction of connector portion 20B3, projection 25*a*3 includes an inclined surface 28 inclined radially outward, in a direction toward gas generating agent accommodation chamber S1. The number of projections 25*a*3 is not particularly restricted; a single projection or a plurality of projections may be provided. In cylinder type gas generator 2, two projections 25*a*3 are arranged at positions in rotational symmetry through 180° when viewed along the axial direction of connector portion 20B3**.

As shown in FIGS. 17 and 18, in a state before assembly of connector portion 20B3 to holder portion 20A3, projection **25*a*3 projects toward first end surface 22 of first barrel portion 21 of holder portion 20A3. Since projection 25*a*3 includes inclined surface 28, on the other hand, projection 25*a*3 is tilted radially outward (that is, in a direction shown with an arrow F in FIG. 18) while it comes in contact with first end surface 22 in press-fitting of connector portion 20B3 to housing main body 10**.

Projection **25*a*3 where elastic resilience is produced as a result of such tilting and first end surface 22 of holder portion 20A3 abut on each other in the axial direction of holder portion 20A3 and connector portion 20B3. Connector portion 20B3 is thus immovably fixed in the axial direction. Projection 25*a*3 and first end surface 22 are preferably in pressure contact with each other in the axial direction while elastic resilience is produced in projection 25*a*3**.

Projection **25*a*3 where elastic resilience is produced as a result of tilting and the inner circumferential surface of housing main body 10 abut on each other in the radial direction of connector portion 20B3. Connector portion 20B3 is thus immovably fixed in the circumferential direction thereof. Projection 25*a*3 and the inner circumferential surface are preferably in pressure contact with each other in the radial direction while elastic resilience is produced in projection 25*a*3**.

According to such a construction as well, an effect similar to the effect described in the first embodiment described above is obtained.

Furthermore, in cylinder type gas generator 2 according to the present embodiment, as shown in FIG. 15, projection **25*a*3 abut in the radial direction on the inner circumferential surface of housing main body 10 at two locations in the circumferential direction of connector portion 20B3. Wobbling in the circumferential direction of connector portion 20B3** can thus more reliably be prevented.

Though a projection provided with inclined surface 28 described above is illustrated and described as projection **25*a*3 in cylinder type gas generator 2 according to the present embodiment, the shape of projection 25*a*3 is not particularly limited as such. Specifically, projection 25*a*3 should only be constructed to be tilted radially outward while projection 25*a*3 comes in contact with first end surface 22 as a result of press-fitting of connector portion 20B3 to housing main body 10, and for example, the projection may be provided with a weak portion by cutting away a part of an outer surface in the radial direction. Alternatively, a guide surface inclined to guide projection 25*a*3 radially outward may be provided in a portion of first end surface 22 of holder portion 20A corresponding to projection 25*a*3**.

Additional Aspect

Characteristic features of the gas generators disclosed in the embodiments described above are summarized as below.

Additional Aspect 1

A gas generator includes
- a cylindrical housing main body made of metal, the housing main body containing a combustion chamber where a gas generating agent is accommodated,
- a holder assembly inserted in an opening end in an axial direction of the housing main body, the holder assembly including a hollow opening like a through hole, the hollow opening extending along a direction in parallel to the axial direction, and
- an igniter including an ignition portion where an ignition agent is accommodated and a terminal pin connected to the ignition portion, at least a part of the igniter being arranged in inside of the hollow opening while the ignition portion is located on a side of the combustion chamber and the terminal pin is located opposite to the side of the combustion chamber,
- the holder assembly includes
  - a holder portion made of metal, the holder portion being located on the side of the combustion chamber, the holder portion receiving and holding the igniter, and
  - a connector portion made of resin, the connector portion being located opposite to the side of the combustion chamber, the connector portion receiving a connector connected to the terminal pin,
- the holder portion includes a first barrel portion in a cylindrical shape that defines the hollow opening,
- the connector portion includes
  - a second barrel portion in a cylindrical shape that defines the hollow opening, and
  - a locking portion that projects from the second barrel portion toward an inner circumferential surface of the housing main body,
- the first barrel portion is provided with a first end surface that faces the second barrel portion, at an end of the first barrel portion opposite to the combustion chamber,
- the first end surface is provided with a recess,
- the second barrel portion is provided with a second end surface that faces the first barrel portion, at an end of the second barrel portion on a side of the combustion chamber,
- the second end surface is provided with a projection,
- the inner circumferential surface of the housing main body is provided with a step portion where the locking portion can be locked,
- the projection and the recess abut on each other in the axial direction and the locking portion and the step portion abut on each other in the axial direction so that the connector portion is immovably fixed in the axial direction, and
- the projection and the recess abut on each other in a circumferential direction of the housing main body so that the connector portion is immovably fixed in the circumferential direction.

Additional Aspect 2

In the gas generator described in Additional Aspect 1, the projection is in a shape of a frustum of a pyramid.

Additional Aspect 3

In the gas generator described in Additional Aspect 1, the projection and the recess extend along a direction intersecting with the circumferential direction, and the projection is fitted into the recess so that a side surface of the projection located in the circumferential direction is in surface contact with the recess.

Additional Aspect 4

In the gas generator described in any one of Additional Aspects 1 to 3, a plurality of projections and a plurality of recesses are provided in the circumferential direction.

[Additional Aspect 5]

A gas generator includes a cylindrical housing main body made of metal, the housing main body containing a combustion chamber where a gas generating agent is accommodated, a holder assembly inserted in an opening end in an axial direction of the housing main body, the holder assembly including a hollow opening like a through hole, the hollow opening extending along a direction in parallel to the axial direction, and an igniter including an ignition portion where an ignition agent is accommodated and a terminal pin connected to the ignition portion, at least a part of the igniter being arranged in inside of the hollow opening while the ignition portion is located on a side of the combustion chamber and the terminal pin is located opposite to the side of the combustion chamber, the holder assembly includes a holder portion made of metal, the holder portion being located on the side of the combustion chamber, the holder portion receiving and holding the igniter, and a connector portion made of resin, the connector portion being located opposite to the side of the combustion chamber, the connector portion receiving a connector connected to the terminal pin, the holder portion includes a first barrel portion in a cylindrical shape that defines the hollow opening, the connector portion includes a second barrel portion in a cylindrical shape that defines the hollow opening, and a locking portion that projects from the second barrel portion toward an inner circumferential surface of the housing main body, the first barrel portion is provided with a first end surface that faces the second barrel portion, at an end of the first barrel portion opposite to the combustion chamber, the second barrel portion is provided with a second end surface that faces the first barrel portion, at an end of the second barrel portion on a side of the combustion chamber, the second end surface is provided with a projection, the inner circumferential surface of the housing main body is provided with a step portion where the locking portion can be locked, while the projection is tilted outward in a radial direction of the housing main body, the projection and the first end surface abut on each other in the axial direction so that the connector portion is immovably fixed in the axial direction, and while the projection is tilted outward in the radial direction, the projection and the inner circumferential surface of the housing main body abut on each other in the radial direction so that the connector portion is immovably fixed in a circumferential direction of the housing main body.

Additional Aspect 6

In the gas generator described in Additional Aspect 5, in a side surface of a portion of the projection located on an inner side in the radial direction, the projection includes an inclined surface inclined outward in the radial direction, in a direction toward the combustion chamber.

Additional Aspect 7

In the gas generator described in Additional Aspect 5 or 6, a plurality of projections are provided in the circumferential direction.

(Other Forms)

In the embodiments of the present invention described above, an example in which the present invention is applied to a cylinder type gas generator incorporated in a side air bag apparatus is illustrated and described. Applications of the present invention, however, are not limited thereto and the present invention can be applied also to a cylinder type gas generator incorporated in a curtain air bag apparatus, a knee air bag apparatus, or a seat cushion air bag apparatus or what is called a T-shaped gas generator having an elongated outer geometry similarly to the cylinder type gas generator.

Though an example in which two step portions are provided in the housing main body is illustrated and described in the embodiments of the present invention described above, the number of step portions is not particularly limited to two; a single step portion or at least three step portions may be provided. This is also applicable to the number of locking portions to be provided in the connector portion.

Though an example in which two projections are provided in the connector portion is illustrated and described in the embodiments of the present invention described above, the number of projections is not particularly limited to two; a single projection or at least three projections may be provided. This is also applicable to the number of recesses to be provided in the holder portion.

The embodiments disclosed herein are thus illustrative and non-restrictive in every respect. The technical scope of the present invention is delimited by the terms of the claims, and includes any modifications within the scope and meaning equivalent to the terms of the claims.

REFERENCE SIGNS LIST

1, 1A, 1B, 2 cylinder type gas generator; 10 housing main body; 11 gas discharge opening; 12 step portion; 20 holder assembly; 20A, 20A2, 20A3 holder portion; 20B, 20B1, 20B2, 20B3 connector portion; 21 first barrel portion; 22 first end surface; 22*a*, 22*a*2 recess; 23*a* accommodation portion; 23*b* swaging portion; 24 second barrel portion; 25 second end surface; 25*a*, 25*a*1, 25*a*2, 25*a*3 projection; 26 locking portion; 27 sealing member; 28 inclined surface; 30 closing member; 40 igniter; 41 base; 42 ignition portion; 43 terminal pin; 50 partition member; 51 separation wall portion; 51*a* score; 52 annular wall portion; 60 gas generating agent; 70 coil spring; 71 circular cylindrical portion; 72 pressing portion; 80 filter; 81 hollow portion; 82 gap portion; 90, 91, 92 welded portion; 100 autoignition agent; S1 gas generating agent accommodation chamber; S2 filter chamber.

The invention claimed is:

1. A gas generator, comprising:

a cylindrical housing main body made of metal, the housing main body containing a combustion chamber where a gas generating agent is accommodated;

a holder assembly inserted in an opening end in an axial direction of the housing main body, the holder assembly including a hollow opening, the hollow opening being a through hole and extending along a direction in parallel to the axial direction; and an igniter including an ignition portion where an ignition agent is accommodated and a terminal pin connected to the ignition portion, at least a part of the igniter being arranged in inside of the hollow opening while the ignition portion is located on a side of the combustion chamber and the terminal pin is located opposite to the side of the combustion chamber, wherein the holder assembly includes a holder portion made of metal, the holder portion being located on the side of the combustion chamber, the holder portion receiving and holding the igniter, and a connector portion made of resin, the connector portion being located opposite to the side of the combustion chamber, the connector portion receiving a connector connected to the terminal pin, the holder portion includes a first barrel portion in a cylindrical shape that defines the hollow opening, the connector portion includes a second barrel portion in a cylindrical shape that defines the hollow opening, and a locking portion that projects from the second barrel portion toward an inner circumferential surface of the housing main body, the first barrel portion is provided with a first end surface that faces the second barrel portion, at an end of the first barrel portion opposite to the combustion chamber, the first end surface is provided with a recess, the second barrel portion is provided with a second end surface that faces the first barrel portion, at an end of the second barrel portion on the side of the combustion chamber, the second end surface is provided with a projection, the inner circumferential surface of the housing main body is provided with a step portion where the locking portion can be locked, the projection and the recess abut on each other in the axial direction and the locking portion and the step portion abut on each other in the axial direction so that the connector portion is immovably fixed in the axial direction, and while elastic resilience in a circumferential direction of the housing main body is produced in the projection owing to deformation by compression of the projection in the axial direction, the projection and the recess abut on each other in the circumferential direction so that the connector portion is immovably fixed in the circumferential direction.

2. The gas generator according to claim 1, wherein the projection is in a shape of a frustum of a pyramid.

3. The gas generator according to claim 2, wherein a plurality of projections and a plurality of recesses are provided in the circumferential direction.

4. The gas generator according to claim 1, wherein the projection and the recess extend along a direction intersecting with the circumferential direction, and the projection is fitted into the recess so that a side surface of the projection located in the circumferential direction is in surface contact with the recess.

5. The gas generator according to claim 4, wherein a plurality of projections and a plurality of recesses are provided in the circumferential direction.

6. The gas generator according to claim 1, wherein a plurality of projections and a plurality of recesses are provided in the circumferential direction.

7. A gas generator, comprising:

a cylindrical housing main body made of metal, the housing main body containing a combustion chamber where a gas generating agent is accommodated;

a holder assembly inserted in an opening end in an axial direction of the housing main body, the holder assembly including a hollow opening, the hollow opening being a through hole and extending along a direction in parallel to the axial direction; and an igniter including an ignition portion where an ignition agent is accommodated and a terminal pin connected to the ignition portion, at least a part of the igniter being arranged in inside of the hollow opening while the ignition portion is located on a side of the combustion chamber and the terminal pin is located opposite to the side of the combustion chamber, wherein the holder assembly includes a holder portion made of metal, the holder portion being located on the side of the combustion chamber, the holder portion receiving and holding the igniter, and a connector portion made of resin, the connector portion being located opposite to the side of the combustion chamber, the connector portion receiving a connector connected to the terminal pin, the holder portion includes a first barrel portion in a cylindrical shape that defines the hollow opening, the connector portion includes a second barrel portion in a cylindrical shape that defines the hollow opening, and a locking portion that projects from the second barrel portion toward an inner circumferential surface of the housing main body, the first barrel portion is provided with a first end surface that faces the second barrel portion, at an end of the first barrel portion opposite to the combustion chamber, the second barrel portion is provided with a second end surface that faces the first barrel portion, at an end of the second barrel portion on the side of the combustion chamber, the second end surface is provided with a projection, the inner circumferential surface of the housing main body is provided with a step portion where the locking portion can be locked, while the projection is tilted outward in a radial direction of the housing main body, the projection and the first end surface abut on each other in the axial direction so that the connector portion is immovably fixed in the axial direction, and while the projection is tilted outward in the radial direction, the projection and the inner circumferential surface of the housing main body abut on each other in the radial direction so that the connector portion is immovably fixed in a circumferential direction of the housing main body.

8. The gas generator according to claim 7, wherein in a side surface of a portion of the projection located on an inner side in the radial direction, the projection includes an inclined surface inclined outward in the radial direction, in a direction toward the combustion chamber.

9. The gas generator according to claim 8, wherein a plurality of projections is provided in the circumferential direction.

10. The gas generator according to claim 7, wherein a plurality of projections is provided in the circumferential direction.

* * * * *